March 5, 1957
D. M. PEARL
2,784,008
BICYCLE BALANCER CONSTRUCTION
Filed Aug. 3, 1953
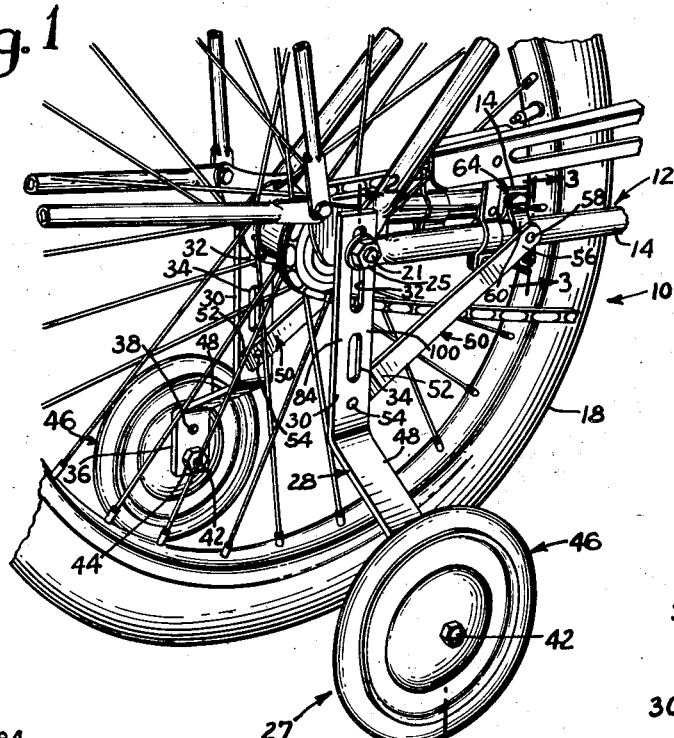
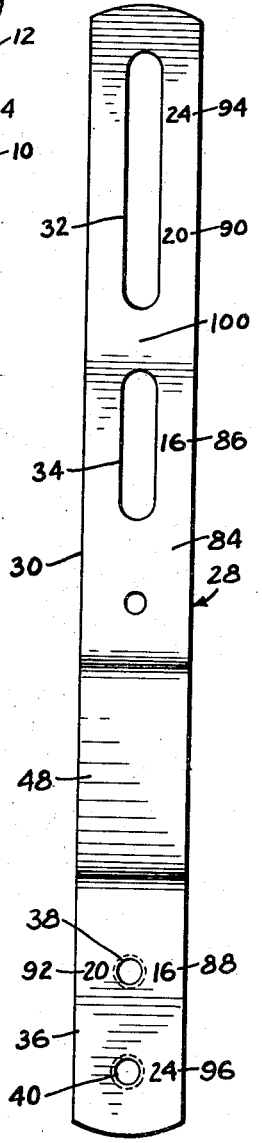
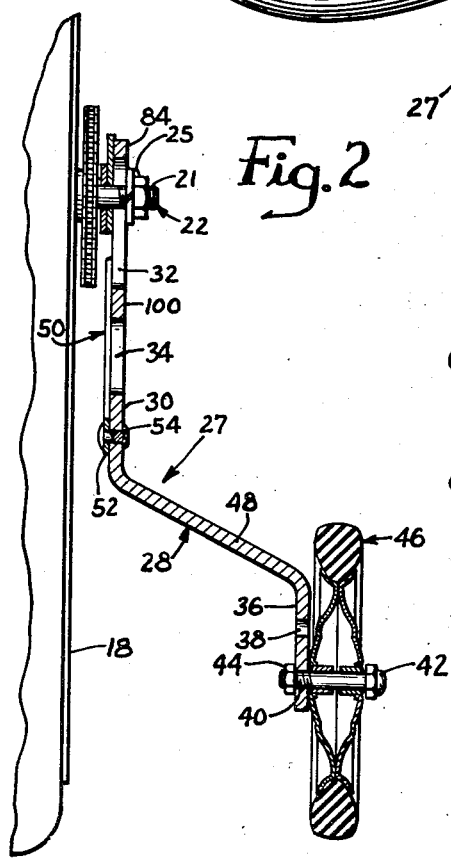
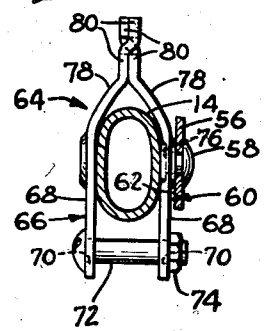
INVENTOR.
Daniel M. Pearl
BY Louis Sheldon
atty.

United States Patent Office 2,784,008
Patented Mar. 5, 1957

2,784,008
BICYCLE BALANCER CONSTRUCTION

Daniel M. Pearl, Chicago, Ill., assignor to Darwin Products, Inc., Chicago, Ill., a corporation of Illinois Application August 3, 1953, Serial No. 372,038

11 Claims. (Cl. 280—304)

This invention relates to bicycle balancing devices and embodies improvements in the construction forming the subject matter of my co-pending application Serial No. 269,818, filed February 4, 1952, entitled "Bicycle Balancer."

An object of the invention is to provide an extremely simple and dependable bicycle balancing construction mountable at each side of the bicycle rear wheel and characterized in that such construction is extremely simple, inexpensive and dependable, embodying a minimum of parts which may be assembled into a unit prior to attachment to the bicycle.

Another object is to provide a bicycle balancer enabling the same to be speedily mounted in the proper adjustment according to the diameter of the bicycle rear wheel.

A further object is to provide a bicycle balancer bearing designations appropriately located to enable the balancer to be properly mounted to cooperate selectively with bicycle rear wheels of small, medium, and large diameters, for example 16", 20", 24" and 26" diameters.

An additional object is to provide novel and improved means for bracing a bicycle balancer bracket.

It is also an object to provide an improved clamp for securing the stabilizer strut to the bicycle frame.

Further objects and advantages of the invention will appear as the description proceeds.

The invention will be better understood upon reference to the following description and the accompanying drawing, in which:

Fig. 1 is a fragmentary perspective view of the rear part of a bicycle equipped with balancing mechanism according to the invention.

Figs. 2 and 3 are enlarged sectional views taken as indicated by the lines 2—2 and 3—3, respectively, in Fig. 1.

Fig. 4 is an enlarged side elevational view of the bracket of the invention.

Referring now more particularly to the drawing, disclosing an illustrative embodiment of the invention, there is shown a bicycle 10 having a frame 12 with rear side arms 14 straddling the rear wheel 18 and through which pass the threaded ends 21 of the rear axle 22. The axle end nuts 25 normally holding the frame 12 in assembly with the wheel 18 and axle 22 are removed to enable the structure of the invention to be mounted on the axle, and are reapplied to a part of said structure for that purpose, as will appear.

The device of the invention involves two preferably identical units or assemblies 27 arranged at opposite sides of the rear wheel 18 of the bicycle. Each unit 27 comprises a rigid generally Z-shaped bracket 28 having an inner upper vertical arm 30 formed with alined vertically elongated upper and lower slots 32 and 34, selectively adapted to receive an axle end 21, an outer lower vertical arm 36 having vertically alined upper and lower tapped holes 38 and 40, for selectively receiving a stub axle bolt 42 by means of which, together with a nut 44, an outboard balancing wheel 46 is mounted and journaled, and an inclined intermediate portion 48 connecting the arms 30 and 36.

For stabilizing the bracket 28, I provide a strut 50 pivoted at one end 52 as at 54 to the lower part of the upper bracket arm 30, the other end 56 of the strut having swiveled thereto, as at 58, a clamp element 60 disposed at the inner face 62 of the strut and adapted to be clamped against the outer side of a frame arm 14. The element 60 forms part of a clamp unit 64, which includes a separate preferably identical complemental clamp element 66 adapted to engage the inner side of said frame arm 14.

Each clamp element may be in the form of a sheet metal strap having a preferably flat portion 68 formed at its free end with a hole 70 for the passage of the stem of a clamping bolt 72 with which a nut 74 is adapted to cooperate to firmly clamp the elements to said arm 14 and thus rigidly brace the bracket 30, and formed at its inner end with a perforated depression 76 for the reception of a head of the swiveling rivet 58 or the like. Each clamping element has a curved intermediate portion 78 and a preferably flat L-shaped end portion 80 adapted to be slipped into interlocked relation with the L-shaped portion of the other clamping element as shown to provide a pivotal effect therebetween, so that when the clamping elements are thus assembled and arranged at opposite sides of a frame arm 14 and a bolt 72 and nut 74 are applied as shown, the clamp unit 64 may be firmly clamped thereto. It is apparent that the clamp element 66 may be readily assembled with and disassembled from the clamp element 60, and that the clamp unit 64 is applicable to frame arms of different sizes and shapes.

By reason of the slots 32 and 34 and the holes 38 and 40 in the bracket 28, the same balancing unit 27 is capable of selective service with bicycle rear wheels of small, medium and large diameters. Such diameters are commonly 16", 20", 24", and 26", and, for the purpose of eliminating guesswork and enabling the unit to be mounted in proper position depending on the rear wheel diameter, the bracket bears appropriate indicia which for convenience may be stamped on the outer face 84 thereof. Such indicia are preferably in the form of numerals representing inches, such as the numeral 16 adjacent the center of the lower slot 34 as shown at 86 and adjacent the upper hole 36 as at 88, the numeral 20 adjacent the lower part of the upper slot 32 as at 90 and adjacent the upper hole as at 92, and the numeral 24 adjacent the upper part of the upper slot as at 94 and adjacent the lower hole 40 as at 96.

It is thus apparent that if the balancing unit 27 is to be used with a 16" diameter bicycle rear wheel 18, the balancing wheel 44 will be mounted with its axle 42 threaded into the upper hole 38, and the bracket 28 so mounted that the rear wheel axle end 21 passes through the lower slot 34 adjacent the 16" notation; with a 20" diameter bicycle rear wheel, the balancing wheel will be mounted as just noted, and the rear wheel axle end will pass through the upper slot 32 adjacent the 20" notation; and with a 24" diameter bicycle rear wheel, the balancing wheel will be mounted with its axle threaded into the lower hole 40 and the rear wheel axle end will pass through the upper slot adjacent the 24" notation. The balancing wheels 46 in such cases are preferably 6" in diameter. For a 26" diameter bicycle rear wheel, 8" diameter balancing wheels are preferably employed and will be mounted as aforesaid for a 24" diameter bicycle rear wheel. The slots 32 and 34 are vertically elongated to permit adjustment of the distance of the balancing wheels from the ground in accordance with the progress of learning by the child in riding the bicycle.

Instead of providing two slots 32 and 34 a single continuous slot could be provided, but the double slot arrangement is preferred because the interventing portion 100 affords strength where it is needed.

The bracket 28 and parts connected thereto are preferably formed of steel or other suitable material to afford the requisite strength etc.

Various modifications may suggest themselves to those skilled in the art without departing from the spirit of my invention. Hence I do not wish to be restricted to the specific forms shown or uses mentioned, except to the extent indicated in the appended claims, which are to be interpreted as broadly as the state of the art will permit.

I claim:

1. In a bicycle balancer, a bracket having a top inner vertical portion formed with vertically elongated and alined slots adapted to selectively receive an end of the rear wheel axle whereby the usual axle end nut may clamp said bracket to the axle at different elevations, said bracket having a bottom vertical outer portion formed with vertically spaced horizontal tapped holes adapted selectively to receive the threaded end of a stub axle of an outboard balancing wheel, said slots being arranged for the accommodation of the axle ends of bicycle rear wheels of small, medium, and large diameters, one of said holes and the lower slot being used for a small diameter bicycle rear wheel, the upper hole and the upper slot being used for a medium diameter bicycle rear wheel, and the lower hole and the upper slot being used for the large diameter bicycle rear wheel, a stabilizer strut pivotally connected at one end to said top vertical bracket portion below said lower slot, a clamp member having an intermediate portion swiveled to the other end of said strut at the inner face of said strut for the reception of a side of a rear frame arm of the bicycle, a complemental clamp member for the reception of said rear frame arm opposite that of the first-mentioned clamp member, said first mentioned clamp member being formed at its ends to be coupled to said complemental clamp member so that said first mentioned clamp member and said complemental clamp member may be securely clamped to said opposite sides of the frame arm forwardly of the rear bicycle wheel axle, said bracket bearing the small diameter numeral in inches adjacent said one hole and also adjacent the lower slot, the medium diameter numeral in inches adjacent the upper hole and also adjacent the upper slot, and the large diameter numeral in inches adjacent the lower hole and also adjacent the upper slot.

2. In a bicycle balancer, a bracket having a vertical top inner vertically slotted portion adapted to receive at different elevations thereof the threaded end of the bicycle rear wheel axle and to be clamped to the axle by the usual nut associated with the axle, said bracket having a bottom outer vertical portion formed with two vertically spaced horizontal tapped holes adapted selectively to receive the threaded end of a stub axle of an outboard balancing wheel, said holes and slotted portion being arranged for adapting said bracket for use with bicycle rear wheels of small, medium and large diameters, one of said holes and a lower part of said slotted portion being used with a small diameter bicycle rear wheel, the upper hole and an intermediate part of said slotted portion being used with a medium diameter bicycle rear wheel, and the lower hole and a portion of said slotted portion being used with a large diameter bicycle rear wheel, a stabilizer strut pivotally connected at one end to the lower part of said slotted portion, and a clamp comprising separable pivotally connected elements, one element being intermediately swiveled to the other end of said strut at the inner face thereof for the reception of the outer side of a rear frame arm of the bicycle, said clamp elements having holes at the ends thereof opposite the pivotal connection therebetween for accommodating a screw which, with a nut, is adapted to firmly clamp said elements to the frame arm forwardly of the rear wheel axle.

3. In a bicycle balancer, a bracket having a vertical top inner portion having a hole adapted to receive the threaded end of the bicycle rear wheel axle and to be clamped to the axle by the usual nut associated with the axle, said bracket having a bottom outer portion formed to support an outboard balancing wheel, a stabilizer strut permanently pivoted at one end to said bracket, and means for connecting the other end of said strut to a bicycle rear frame arm forwardly of the axle, said connecting means comprising a clamp element permanently swiveled to the other end of said strut and arranged for engagement with one side of the frame arm, a separate complemental clamp element arranged for engagement with the other side of said frame arm opposite that of said first-mentioned clamp element, and means for drawing said clamp elements together.

4. In a bicycle balancer, a bracket having a top inner vertical portion formed with vertically elongated upper and lower slots of a width such as to slidably receive an end of the rear wheel axle whereby the usual axle end nut may clamp said bracket to the axle at different elevations, the upper slot having a length which exceeds its width by an amount at least substantially twice that by which the length of the lower slot exceeds said width, said bracket having a bottom vertical outer portion formed with vertically spaced horizontal holes adapted selectively to receive a stub axle of an outboard balancing wheel, said slots being arranged for the selective accommodation of the axle ends of bicycle rear wheels of small, medium, and large diameters, one of said holes and the lower slot being used for a small diameter bicycle rear wheel, the upper hole and the upper slot being used for the medium diameter bicycle wheel, and the lower hole and the upper slot being used for the large diameter bicycle wheel, said bracket bearing the small diameter numeral in inches adjacent said one hole and also adjacent the lower slot, the medium diameter numeral in inches adjacent said one hole and also adjacent the upper slot, and the large diameter numeral in inches adjacent the lower hole and also adjacent the upper slot, a stabilizer strut pivoted to said bracket, and clamping means swiveled to said strut remote from the pivoted portion of said strut and formed for the reception of a rear frame arm of the bicycle forwardly of the rear wheel axle.

5. In a bicycle balancer, a bracket having an upper inner vertically perforated portion adapted to receive at different elevations thereof the threaded end of a bicycle rear wheel axle and to be clamped to the axle by the usual nut associated with the axle, said bracket having a bottom outer vertical perforated portion for receiving a stub axle of an outboard balancing wheel, said portions being arranged for adapting said bracket for selective use with bicycle rear wheels of small, medium and large diameters, a stabilizer strut permanently pivoted to said bracket substantially below the top thereof, and means for connecting said strut to a bicycle rear frame arm forwardly of the rear wheel axle, said means comprising a clamping element permanently swiveled to said strut remote from the pivoted portion of said strut and arranged to engage the rear frame arm.

6. In a bicycle balancer, a bracket having a vertical top inner vertically slotted portion adapted to receive at different elevations thereof the threaded end of the bicycle rear wheel axle and to be clamped to the axle by the usual nut associated with the axle, said bracket having a bottom outer vertical portion formed with two vertically spaced horizontal tapped holes adapted selectively to receive the threaded end of a stub axle of an outboard balancing wheel, said holes and slotted portion being arranged for adapting said bracket for use with bicycle rear wheels of small, medium, and large diameters, one of said holes and a lower part of said slotted portion being used with a small diameter bicycle rear wheel, the upper hole and an intermediate part of said slotted portion being used with a medium diameter bicycle rear wheel, and the lower hole and a portion of said slotted portion being used with a large diameter bicycle rear wheel, a stabilizer strut pivotally connected at one end to the lower part of said top portion, and a clamp comprising separable elements, one element being intermediately swiveled to the other end of said strut, means at one end of each element for coupling said ends, said elements having holes at the other ends thereof for accommodating a screw which, with a nut, is adapted to firmly clamp said elements to the bicycle frame arm forwardly of the rear wheel axle.

7. In a bicycle balancer, a bracket having a top inner vertical portion formed with a vertically elongated slot of a width such as to slidably receive an end of the rear wheel axle whereby the usual axle and nut may clamp said bracket to the axle at different elevations, said bracket having a bottom vertical outer portion formed with vertically spaced horizontal holes adapted selectively to receive a stub axle of an outboard balancing wheel, said slot being arranged for the selective accommodation of the axle ends of bicycle rear wheels of small and relatively large diameters, the upper hole and a lower part of the slot being used for the small diameter bicycle rear wheel, and the lower hole and an upper part of the slot being used for the larger diameter bicycle rear wheel, a stabilizer strut pivoted to said bracket, and clamping means swiveled to said strut remote from the pivoted portion of said strut and formed for the reception of a rear frame arm of the bicycle forwardly of the rear wheel axle.

8. The combination of claim 7 wherein said top inner vertical portion of said bracket has an opening vertically spaced from said slot which opening is sized to receive said rear wheel axle at a different elevation than said slot, one of said horizontal holes and said opening being used for a bicycle rear wheel having a size substantially different from said small and larger diameter wheels, said bracket opposite each of said slot opening and holes bearing indicia of the various bicycle rear wheel diameter with which the adjacent portions of said bracket are used.

9. The combination of claim 7 wherein said top inner vertical portion of said bracket has an opening vertically spaced from said slot which opening is sized to receive said rear wheel axle at a different elevation than said slot, one of said horizontal holes and said opening being used for a bicycle rear wheel having a size substantially different from said small and larger diameter wheels.

10. In a bicycle balancer, a stub axle, a bracket having a top inner vertical portion formed with vertically elongated alined slots adapted to selectively receive an end of the rear wheel axle of the bicycle whereby the usual axle and nut may clamp said bracket to the axle at different elevations, said bracket having a bottom vertical outer portion, said slots being arranged for the accommodation of the axle ends of bicycle rear wheels of small, medium, and large diameters, said stub axle and said bottom vertical outer portion of said bracket arranged to assume at least two relative positions where the outer stub axle end may have an upper and a lower portion relative to the bracket, a stabilizer strut pivotally connected at one end to said top vertical bracket portion below said lower slot, a clamp member having an intermediate portion swiveled to the other end of said strut at the inner face of said strut for the reception of a side of a rear frame arm of the bicycle, and a complemental clamp member for the reception of said rear frame arm opposite that of the first-mentioned clamp member, said first-mentioned clamp member being formed at its ends to be coupled to said complemental clamp member so that said first-mentioned clamp member and said complemental clamp member may be securely clamped to said opposite sides of the frame arm forwardly of the rear bicycle wheel axle.

11. In a bicycle balancer, a bracket having a top inner vertical portion formed with perforations adapted to selectively receive an end of the rear wheel axle whereby the usual axle and nut may clamp said bracket to the axle at different elevations, said bracket having a vertical outer portion, a stub axle, said stub axle and said bottom vertical outer portion of said bracket adapted to assume at least two relative positions where the outer end of said stub axle may have an upper and a lower position relative to the bracket, said perforated portion of said bracket being arranged for the accommodation of the axle ends of bicycle rear wheels of small, medium, and large diameters, a stabilizer strut pivotally connected at one end to said top vertical bracket portion below said perforated portion thereof, a clamp member having a portion swiveled to the other end of said strut at the inner face of said strut for the reception of a side of a rear frame arm of the bicycle, and a complementary clamp member for the reception of said rear frame arm opposite that of the first-mentioned clamp member, said first-mentioned clamp member being formed at its ends to be coupled to said complemental clamp member so that said first-mentioned clamp member and said complemental clamp member may be securely clamped to said opposite sides of the frame arm forwardly of the rear bicycle wheel axis.

References Cited in the file of this patent

UNITED STATES PATENTS

| | | |
|---|---|---|
| 466,044 | Jacobs | Dec. 29, 1891 |
| 559,646 | Werneth | May 5, 1896 |
| 650,211 | Wirth | May 22, 1900 |
| 661,145 | Hausmann | Nov. 6, 1900 |
| 2,462,769 | Pedersen | Feb. 22, 1949 |
| 2,612,388 | McNeill et al. | Sept. 30, 1952 |
| 2,712,947 | Pawsat et al. | July 12, 1955 |
| 2,715,033 | Fogarty et al. | Aug. 9, 1955 |

FOREIGN PATENTS

| | | |
|---|---|---|
| 585,036 | France | Dec. 2, 1924 |
| 689,864 | France | June 3, 1930 |